United States Patent Office 2,990,263
Patented June 27, 1961

2,990,263
PROCESS FOR MANUFACTURING ROCKET PROPELLANTS
William H. Avery, Silver Spring, Md., assignor to the United States of America as represented by the Secretary of the Navy
No Drawing. Filed Feb. 3, 1949, Ser. No. 74,487
2 Claims. (Cl. 52—.5)

The present invention relates generally to rocket fuels, and more specifically to an improved large scale process for safely manufacturing such fuels, generally called "propellants," of the composite type, that is, comprising more than one chemical substance, examples being the compositions known as Aeroplex propellants.

An object of the invention is to provide an improved process of making propellants, that can be practised on a large scale, will yield products having uniform characteristics, and is relatively much safer than procedures heretofore used in making these potentially explosive compositions.

At present the manufacture of composite type propellants comprises at least seven successive steps, namely, grinding and sizing a solid oxidizer, preparing a polymerizable resinous material, mixing the material and oxidizer into a paste suitable for casting, casting the paste into a suitable mold, curing it in the mold to form a hard propellant grain, removing the finished grain from the mold and machining to size, and finally inhibiting and inspecting it. It will be understood that the term "grain," as used in the present case, designates not a relatively tiny particle, but on the contrary a suitably shaped compact mass of considerable size, weighing, for example, from a pound to several hundred pounds, a single grain of propellant ordinarily constituting the entire propellant charge of a rocket.

Although a propellant made by this process has good ballistic properties, and the procedure is reasonably cheap, there is extreme difficulty in maintaining uniformity in the process, and guaranteeing reliability in the behavior of the final product.

This difficulty is due to the facts that:

(1) The burning rate of the propellant depends on the average particle size and size distribution of the oxidizer and on the homogeneity of the final grain. A further complication arises from the fact that the powdered oxidizer agglomerates or sets on standing, so that grinding must take place not more than a few hours before casting. Blending of a large lot of ground oxidizer is, therefore, not possible.

(2) Air bubbles, which are difficult to avoid and which lead to uneven burning of the propellant grain, are introduced during the mixing and casting operation.

(3) The curing is exothermic, causing temperature gradients to occur in the curing grain, and also shrinkage of the entire grain on curing. These two effects lead to the development of internal stresses in the finished grains and to difficulty in removing the grains from the mold if an internal core is used.

Most of these difficulties may be eliminated by manufacture of grains of this type by a new process. This process, which constitutes the present invention, involves, in one manner of practising it, steps which may be grounded as follows because they may be regarded broadly as making up two operations, namely, preparing of materials to be molded and then molding the materials:

(1) An oxidizer and a resin, which acts both as a combustible and a binder, are mixed in any suitable manner. This step is followed by curing and comminuting steps, which result in a coarse powder. The mixture of an oxidizer and a resin may be prepared for curing by extrusion into small strands, or by formation of a film, paste or small granules, which then can be cured by a continuous process such as running the material through a heated space on a conveyor belt. As is well known in the art, the specific temperatures and the duration of heating are interdependent so that, in general, the higher the temperature employed, the shorter the duration of heating. A temperature and duration of heating for satisfactorily curing the mixture can readily be determined by one skilled in the art. The material thus cured is then subjected to a comminuting or other sizing operation, followed by screening and blending to produce particles of fairly uniform shape and of appreciable size, of the order of ½ mm. diameter. The cured intermediate mixture consisting of the resin and the oxidizer can be comminuted or sized by any standard procedure such as grinding, milling, extruding, chopping, etc., to provide material fine enough to be cast or poured readily into molds, and compacted by the application of jiggling, slight pressure, etc., as desired. In order to obtain a maximum bulk-density of the material, it may be desirable to blend several sizes of particles.

(2) The coarse powder so produced is thereupon sifted or fed into a mold and a plasticizing solvent for the resin is added. This solvent will cause swelling of the previously cured particles, as diffusion of the solvent into the particles takes place, so that a homogeneous compact mass will be produced. Since the molding process in this case involves diffusion and not of chemical interaction, the process is thermally neutral and no significant volume changes occur on setting.

Suitable ingredients for use in the steps of the process outlined above include a basic oxidizer, such as, for example, ammonium perchlorate, a resin, such as cellulose nitrate or polyvinyl nitrate and an explosive or non-explosive plasticizer, such as 2,2-dinitro propane or triacetin. The resin may contain sufficient oxidizing groups to provide a substantial part of the requisite oxygen. The oxidizer and the resin may be mixed, in the ratio of 70 parts of the former and 30 parts of the latter.

As was pointed out above, a plasticizing solvent is added to the mixture of a resin and an oxidizer after the mixture has been placed in the mold. In order to get suitable consolidation of the granular particles in the mold, it may be desirable in the case of some ingredients to mix a polymerizable material and the plasticizing solvent and then add this mixture to the mixture of an oxidizer and a resin in the mold. Suitable ingredients of the former mixture are methyl-methacrylate as the polymerizable material and 2,2-dinitro propane as the plasticizing solvent.

The new process has these advantages:

(1) It is adaptable to continuous operation in the preparation of the coarse powder for casting and, therefore, may be carried out with relatively much more safety than current procedure, which requires the handling of large batches of potentially explosive materials.

(2) The process eliminates the need for close control over the particle size of the oxidizer, and substantially eliminates the effects of shrinkage and heat evolution in the curing process.

(3) The casting particles or powder may be prepared and stored in quantities large enough to permit blending of an amount suitable for hundreds of propellant grains. Since the casting operation is susceptible to close control, the blending of large amounts of casting powder permits sufficient control of the properties of the blend to insure reproducible and reliable performance.

(4) The cost of the finished grains does not exceed that of grains as heretofore made. Overall costs may, however, even be considerably reduced through elimination of many of the elaborate inspection and control procedures heretofore necessary.

Obviously many modifications and variations of the present invention are possible in the light of the above teachings. It is therefore to be understood that within the scope of the appended claims the invention may be practiced otherwise than as specifically described.

What is claimed is:

1. A process for making a propellant grain of the composite type including the steps of mixing about 70% of ammonium perchlorate and about 30% of a resinous binder selected from the group consisting of cellulose nitrate and polyvinyl nitrate and including a plasticizer selected from the group consisting of 2,2-dinitro propane and triacetin, curing the mixture in the presence of heat, comminuting the cured mixture to provide particles of suitable size, introducing the particles into a mold, and adding 2,2-dinitro propane to the particles in the mold.

2. A process for making a propellant grain of the composite type including the steps of mixing about 70% of ammonium perchlorate and about 30% of cellulose nitrate, curing the mixture in the presence of heat, comminuting the cured mixture to provide particles of suitable size, introducing the particles into a mold, and adding 2,2-dinitro propane to the particles in the mold.

References Cited in the file of this patent

UNITED STATES PATENTS

| | | |
|---|---|---|
| 1,700,085 | Scott | Jan. 22, 1929 |
| 2,004,436 | Jaeger | June 11, 1935 |
| 2,056,794 | Macht et al. | Oct. 6, 1936 |
| 2,297,248 | Rudolph | Sept. 29, 1942 |
| 2,335,371 | Willis | Nov. 30, 1943 |

FOREIGN PATENTS

| | | |
|---|---|---|
| 579,057 | Great Britain | July 22, 1946 |

OTHER REFERENCES

Bogin: "How the Coating Industry Is Using the Nitroparaffins," Paint, Oil, and Chemical Review, pp. 8–10, 25–29, Oct. 8, 1942. (Copy in Patent Office Library.)